United States Patent Office 3,410,816
Patented Nov. 12, 1968

3,410,816
PROCESS FOR THE OXIDATION OF A POLY-
ETHYLENE-PARAFFIN BLEND
Frank A. Mirabile, Wayne, and Steven T. Rabel, Boonton, N.J., assignors, by mesne assignments, to Allied Chemical Corporation, New York, N.Y., a corporation of New York
No Drawing. Filed Feb. 26, 1965, Ser. No. 435,716
4 Claims. (Cl. 260—28.5)

This invention relates to a process for oxidizing ploymeric material. More particularly this invention is directed to the solid state oxidation of high density polyethylene in the presence of paraffin.

As used herein the term "high density polyethylene" means ethylene homopolymers and copolymers of ethylene and other α-olefins wherein said homopolymer and said ethylene copolymers have a density in the range 0.935 to 0.970 grams per cc., a reduced specific viscosity (RSV) in the range 0.8–30 deciliters/g., and a crystalline melting point in the range 115 to 137° C. prior to oxidation. Thus copolymers of ethylene and other α-olefins such as propylene, butene-1, hexene-1, pentene-1, heptene-1, 4-methyl-pentene-1, 3-methyl-butene-1 and the like, which copolymers have densities in the range 0.935 to 0.970 g./cc. and crystalline melting points in the range 115 to 137° C. are operable as starting materials in this invention. For purposes of description, the invention will be explained for the most part using high density linear polyethylene per se as the material unless otherwise stated.

In a copending application having Serial No. 317,054 filed Oct. 17, 1963 and assigned to a common assignee, there is disclosed a method of oxidizing high density high molecular weight polyethylene in the solid state to obtain oxidized resin which is utilizable is emulsion form or per se in conventional processing techniques such as extrusion, injection molding and the like. However, the process therein disclosed has the drawback that although the oxidation rate is commercially acceptable, its duration still leaves something to be desired.

Surprisingly it has now been found that the oxidation rate of high density high molecular weight polyethylene can be increased considerably by blending with the polymer prior to oxidation 5 to 25% preferably 10–20% by weight of the high density polyethylene, of paraffin and thereafter performing the solid state oxidation step. The addition of said paraffin catalyzes the oxidation of the polyethylene and increases the oxidation rate up to 300% or more. By "solid state oxidation" herein is meant that the high density polyethylene remains as a solid during oxidation and the paraffin is in the molten state.

Solid state oxidation of high density polyethylene by the practice of this invention results in oxidized resin grade high density polyethylene having a melt index in the range 0.1 to 50 containing the following range of oxygen-containing functional groups.

| Group: | Range [1] |
|---|---|
| Hydroxyl | 0.035–0.18 |
| Carboxyl | 0.025–0.52 |
| Ester | 0.015–0.24 |
| Total carbonyl | [2] 0.07–0.92 |

[1] Milliequivalents/gram oxidized polyethylene.
[2] 0.2–2.6 wt. percent.

The oxidized emulsion grade high density polyethylene resulting from thep ractiec of the instant invention has a melt index in the range 0.1 to 7000 and contains oxygen-containing function groups in the following range.

| Group: | Range [1] |
|---|---|
| Hydroxyl | 0.04–0.17 |
| Carboxyl | 0.20–2.0 |
| Ester | 0.04–0.50 |
| Total carbonyl | [2] 0.46–2.72 |

[1] Milliequivalents/gram oxidized polyethylene.
[2] 1.3–7.6 wt. percent.

The above described functional groups are the most important ones present in the oxidized polyethylene, in terms of chemical reactivity, emulsifiability, promotion of adhesion to substrates, printability and decorability, vacuum metallizability, etc. of the resins or fabricated objects derived therefrom. Therefore methods have been developed for measuring these groups in a quantitative fashion. However, in addition to these groups, other oxygen-containing species are known or believed to be present in the oxidized polyethylene in somewhat lesser concentrations. Examples of these other groups would be ethers (R–O–R), and the non-carbonyl portion of esters

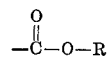

and anhydrides

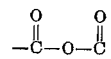

In order to measure quantitatively all of the oxygen present in the oxidized polyethylene, one must therefore resort to a direct elemental analysis of oxygen. In the products of this invention we have found by such direct analysis that the total chemically combined oxygen content may range between 0.75 to 7.0 wt. percent oxygen for the high density polyethylene per se and 0.75 to 9.0 wt. percent oxygen for the polyethylene-paraffin blend.

The solid state oxidation of high density polyethylene in the presence of a minor amount of paraffin avoids the problems encountered in melt oxidation of polyethylene. For example there is no problem with viscosity since oxidation is performed while the polyethylene is in the solid state. Futrhermore since the paraffin catalyzes the oxidation process, these is no problem with oxidation rate since it is possible to rapidly oxidize high density polyethylene at temperatures of 105–135° C. in the solid state below the melting point of the polyethylene. Although the paraffin is molten during the oxidation process, no appreciable viscosity problem arises since it is present in a minor amount, i.e less than 25%. In addition, in regard to the polyethylene there is no upper limit to the molecular weight of the high density polyethylene since there is no viscosity problem in solid state oxidation of the material. Thus polyethylene having a molecular weight of 2,000,000 or more i.e. an RSV up to 30 deciliters/g. or more is readily oxidized by the practice of this invention.

It is critical in practicing the instant invention that the oxidation step used to form the requisite amount of carbonyl in the polymer be performed while the polyethylene is in the solid state at a temperature ranging from 105° C. up to but not including the melting point of the high density polyethylene preferably 110–125° C. If temperatures above the melting point of the high density polymer are used, the problems of cross-linking and high melt viscosity are encountered thereby requiring the oxidation period to be extended 4 or more fold in order to obtain the required carbonyl range, i.e. 0.2 to 7.5 wt. percent carbonyl of oxidized polyethylene. Additionally, on a commercial scale, it is extremely difficult to handle highly viscous molten polymers. On the other hand, if oxidation temperatures below the lower limit of the critical range are used, the oxidation period is approximately doubled for each ten degree drop in temperature. The oxidation step is performed within the critical range as close as practical to the melting point of the polyethylene in order to obtain optimum oxidation rates. Thus the higher the melting point of the high density polyethylene, the higher the oxidation temperature employed within the critical limit. Present day high density polyethylenes have melting points in the range 127 to 137° C. When ethylene containing copolymers are used the melting point range is 115° C. to 131° C. depending on which α-olefin and the amount thereof is used in the copolymer.

Polyethylene after blending with paraffin can be readily oxidized in the solid state by various methods to give polymers containing carbonyl groups. The techniques for introducing carbonyl groups into polyethylene are exemplified by, but not limited to, the following methods: one method would include passing oxygen-containing gas into an oven over a solid polyethylene therein at a temperature below the melting point of the polymer, e.g. 105–135° C. Yet another method would be to pass oxygen-containing gas at a temperature from 105° C. up to the melting point of the polymer through a fluidized bed of polyethylene particles. A further method would include pressing the polyethylene-paraffin into film and thereafter passing hot air or other free oxygen-containing gas thereover at a temperature of 105° C. up to the melting point of the polyethylene. In all the aforestated methods of oxidizing polyethylene, if desired, a minor amount, i.e. 0.05 to 5% by weight of the polyethylene of an organic peroxide, e.g. benzoyl peroxide, ozone, nitrogen tetroxide or other oxidation promoter may be blended with the polymer to eliminate the induction period and increase the oxidation rate. Superatmospheric pressure may be used if desired in any of the oxidation methods employed including those aforestated.

The high density polyethylene operable in this invention can be produced by many methods well known in the art. For example polyethylene having a density of 0.935–0.970 can be obtained using the Phillips catalyst system, i.e. chromium oxide on a $SiO_2$–$Al_2O_3$ support wherein at least part of the chromium is in the hexavalent state. The polymerization is performed at temperatures of 60–260° C. See U.S. 2,825,721. Another catalyst system capable of forming the high density polyethylene used herein is disclosed in U.S. 2,816,883. Yet another catalyst system consisting essentially of vanadium oxytrichloride and ethyl aluminum dichloride will yield high density high molecular weight polyethylene having a melt index less than 0.01. Still another catalyst system yielding very high molecular weight polyethylene having a melt index less than 0.01 and a density of about 0.96 comprises $TiCl_3$ and diethyl aluminum chloride. A still further method of producing high density polyethylene is the Ziegler process wherein the catalyst consists essentially of compounds of metals of Group IVB, VB and VIB and an aluminum trialkyl compound as set out in Belgian Patent 533,362 issued to K. Ziegler. Yet another method of forming high density polyethylene operable herein is disclosed in U.S. 2,949,447. Other methods of producing polyethylene with a density in the range 0.935–0.970 are well known to those skilled in the art.

The copolymers operable in the instant invention can be formed by the methods taught in U.S. 2,825,721 and in Belgian patents 543,259 and 538,782.

The high density polyethylenes operable in the instant invention have a density in the range 0.935–0.970 g./cc. and a melting point in the range 115–137° C. prior to the oxidation step. However the density of the polymer increases as the extent of oxidation increases. This is the result of the substitution of heavier oxygen atoms (atomic weight 16.0) in the polymer in place of hydrogen (atomic weight 1.008) or carbon (atom weight 12.01). Consequently the density ranges of the oxidized products of this invention range between 0.937 and 1.050 g./cc., the exact value in any instance depending on the initial density of the starting polymer, and the extent of oxidation.

The general procedure for preforming the present invention is to blend by suitable means, e.g. a tumbler, ribbon blender etc. the high density polyethylene and 5 to 25 percent by weight of said polyethylene of paraffin. Preferably the polyethylene is in particulate form. The thus blended polyethylene paraffin mixture is then oxidized in a suitable apparatus, e.g. a forced draft oven, by passing an oxygen containing gas, e.g. air, over the mixture while it is being heated at temperatures ranging from 105° C. up to the melting point of the polyethylene.

If desired the oxidation induction period can be decreased by admixing the high density polyethylene with an oxidation promoter, e.g. an organic peroxide (usually 0.1 to 5.0% peroxide by weight of polymer) in a suitable mixing mechanism, e.g. Twin Shell blender, at room temperature prior to oxidation. Preferably the organic peroxide is solubilized in a hydrocarbon solvent which solvent is thereafter evaporated prior to the oxidation step. Solubilizing the peroxide in a solvent insures more uniform dispersion of the peroxide throughout the polymer Various solvents for the peroxide are operable and the selection of a suitable one is governed by its solvent power on the peroxide employed and its inertness thereto. Operable solvents are well known to those skilled in the art and include volatile aromatic and aliphatic hydrocarbons such as benzene, toluene, pentane, and hexane.

The thus blended polymer-paraffin mixture with or without the peroxide oxidation promoter is then subjected to oxidation as aforestated. If ozone is used as a promoter, it is incorporated into the oxygen-containing gas stream. Since the rate of oxidation increases with increasing temperature, it is preferred to carry out the oxidation at as high a temperature as possible without melting the polyethylene material. Thus temperatures within 5–20° C. below the melting point of the polyethylene are usually employed.

The oxidized high density polyethylene of the present invention has a melt index in the range of 0.1 to 7,000 and a carbonyl content of 0.20 to 7.5 weight percent carbonyl. It has been found that the melt index of the oxidized polymer can be maintained below 7,000 even at the upper limit of the carbonyl content provided the starting polymer is of sufficiently high molecular weight. In general the high density polyethylene of the instant invention has a weight average molecular weight in the range 25,000 to 2,000,000 or more (RSV of 0.8–30.0 deciliters/g.) calculated from fractionation data in accord with the procedure in "Techniques of Polymer Characterization," P. W. Allen, p. 3, Academic Press Inc., New York, N.Y. (1959). In regard to the lower limit of the range, care must be exercised that the oxidation does not degrade the polymer to the extent that improved properties which are partially afforded by high molecular weight, e.g., high tensile strength and abrasion resistance are not obtained.

The oxidation step can be terminated at any operable degree of oxidation, i.e., 0.20 to 7.5 wt. percent carbonyl, and if desired subsequently stabilized. For example, a suitable antioxidant such as 4,4′-thiobis (6-t-butyl-meta-cresol) sold under the tradename "Santonox" by Monsanto Chemical Company or N-phenyl-2-naphthylamine can be added to the oxidized polymer. However stabilization of the oxidized polymer is only required to obtain accurate melt index measurements. In actual practice for many applications the oxidized polymer need not be stabilized.

The oxidized high density polyethylene of the instant invention wherein the carboxyl content is 0.2 to 2.0 milliequivalents/gm. polyethylene is readily emulsified in a continuous aqueous phase in the presence of suitable well-known emulsifiers and from 40% to 200% of the theoretical amount of a base required to neutralize the carboxylic acid groups present in the polymer.

The following examples are set down to illustrate the invention and are not deemed to limit its scope. Throughout the instant invention tests were conducted as follows:

The extent of oxidation of the polyethylene was determined by ascertaining the carboxyl content of the polymeric material by titration with base in the following manner. About 1 g. of the polymer to be analyzed was accurately weighed and dissolved in 200 ml. of xylene by heating to 120–130° C. with stirring in a 500 ml. Erlenmeyer flask on a magnetic stirrer-hot plate. About 15 drops of 0.1 %phenolphthalein in absolute ethanol was added. While continuing stirring and maintaining the temperature at 120–130° C., the solution was titrated to a colorless end point with standard 0.05 N potassium hydroxide in absolute ethanol.

Calculation:

$$\text{milliequivs. COOH per gram} = \frac{(\text{ml. of KOH}) (\text{N of KOH})}{(\text{g. of polymer})}$$

The extent of oxidation of the polyethylene was determined by ascertaining the percent carbonyl of the oxidized polymer by measuring the intensity of infrared absorption at 1720 cm.$^{-1}$ assuming an absorbance characteristic of ketone type carbonyl. In actuality, other carbonyl containing functions such as aldehyde, carboxylic acid and carboxylate ester also contribute to the 1720 cm.$^{-1}$ absorption. Therefore, the values reported as percent carbonyl represent a composite of all of these groups. Measurements were made on a Perkin-Elmer spectrophotometer, Model 221. The reported percent carbonyl is defined as $$\frac{\text{gms. C=O}}{\text{gms. of polymer}} \times 100$$

Melt indices (MI) were measured under the conditions specified in ASTMD 1238–57T under Condition E (melt index, i.e., MI) and Condition F (high load melt index, i.e., HLMI).

Densities of the polymer in g./cc. were measured under the conditions specified in ASTMD 1505–57T.

Reduced specific viscosity, i.e. (RSV), was obtained by dissolved 0.1 g. of the polymer in 100 cc. Decalin at 135° C. in accord with the procedure of ASTMD 1601–61.

The crystalline melting point of the polymer was measured as the temperature at which birefringence disappears from the sample when viewed through crossed Nicol prisms in a hot stage microscope heated at a rate of <1° C./min.

Total combined oxygen content of the oxidized polyethylene was determined by the method of J. Unterzaucher, Ber. 1940, 73, 391.

Unless otherwise noted all parts and percentages are by weight.

Example 1

90 parts of commercially available polyethylene having a high load melt index of 1.8, a reduced specific viscosity of 4.5, a density of 0.955 and a crystalline melting point of 135° C. in particulate form were admixed with 10 parts of paraffin having a melting point of 55° C. and tumbled in a Twin Shell dry blender manufactured by Patterson Kelly Co., East Stroudsburg, Pa. After 15 minutes blending, the mixture was removed and placed in an aluminum foil dish to a depth of approximately ¼″. The dish containing the mixture was placed in a Fisher Isotemp forced-draft oven which had been preheated to 120° C. At the end of 24 hours the sample was removed from the oven and cooled to room temperature. On characterization a sample of the blended mixture had a carboxyl content of 0.278 milliequivalent carboxyl per gram and contained 1.22 wt. percent carbonyl. A further sample of the oxidized blend was extracted with refluxing benzene in a Soxhlet thimble for 24 hours to separate the dissolved paraffin from the undissolved high density polyethylene. The separated paraffin portion had a carboxyl content of 0.648 milliequivalent per gram (2.85 wt. percent carbonyl); and the high density polyethylene portion had a carboxyl content of 0.174 milliequivalent per gram (0.76 wt. percent carbonyl).

A control run of the same high density polyethylene without admixture with paraffin prior to oxidation under the same conditions as the blend had a carboxyl content of 0.089 milliequivalent per gram (0.40 wt. percent carbonyl). A comparison of the control with the polyethylene portion of the blend shows about a 100% increase in carboxyl content is obtained by admixing the polyethylene with the paraffin for the same oxidation conditions.

Example 2

A repetition of the above example resulted in approximately the same improvement in oxidation rate over a control when a commercially available copolymer of ethylene-butylene having a density of 0.95, a melt index of 5.0, and a crystalline melting point of 130° C. was substituted for the polyethylene in the procedure of Example 1.

The advantage of the solid state oxidation of high density polyethylene in the presence of paraffin is the ability to utilize a polyethylene of high molecular weight, i.e. from 25,000 up to 2 million or more, i.e. RSV of 0.8 to 30.0 deciliters/g. In the commercial field today, the only available oxidized polyethylenes are waxy low molecular weight branched polymers. These oxidized polyethylenes prior to oxidation are low density polymers (i.e. 0.91–0.93 g./cc.) having low melting points, i.e. 90–110° C. and having low molecular weight (e.g. 1,000–6,000 molecular weight). To utilize these oxidized low molecular weight polyethylenes it is necessary to form emulsions thereof. The reason said oxidized polyethylenes must be emulsified prior to application as coatings, polishings, etc. is because they are extremely low in molecular weight. For example, their molecular weights are so low that melt index values (less than 10,000) cannot be obtained on these polymers. The reason that present day oxidized polyethylenes are of such low molecular weight is that the oxidation is carried out in the melt. Oxidation of polyethylene in the melt causes crosslinking, partially through the oxygen linkages. This phenomena is readily evidenced by an increase in viscosity of the melt. The crosslinked polymer although of high molecular weight, contains gel structure and is of such low polarity that it is difficult or impossible to use or apply per se or even emulsify. Furthermore if the viscosity of the polyethylene increases appreciably in melt oxidation, the oxidation step becomes increasingly impractical.

When oxidizing polyethylene in the melt, it is necessary that the oxygen-containing gas be diffused readily, rapidly and at high concentrations into the molten polymer. If such diffusion is not rapid, the rate of oxidation is so slow that it becomes impractical to accomplish on a commercial scale. Therefore if during the oxidation reaction, the viscosity of the melt increases, the diffusion of oxygen-containing gas through the molten mass will become increasingly difficult and the rate of oxidation will decrease. From a practical viewpoint the seriousness of this diffusion dependency on oxidation rate precludes the use of high molecular weight polyethylene as the starting material in the preparation of an oxidized polyethylene. Since chain scission also occurs during oxidation it is obvious that the molecular weight of the resulting oxidized polymer will be less than that of the starting polymer hence melt oxidation results in low molecular weight polyethylene.

The advantage of the present system over the prior melt oxidation art is that the starting polymer is not limited to any particular molecular weight since in solid state oxidation there is no crosslinking (viscosity) problem and thus oxidation is not curtailed or precluded. In addition, by the practice of the instant invention, the addition of paraffin to the high molecular weight polyethylene results in an increase in the oxidation rate.

The paraffin utilizable in the instant invention is any grade of paraffin that does not contain oxidation inhibitors and will melt and diffuse through the polyethylene during the oxidation step, thereby catalyzing the oxidation of the polyethylene. The amount of paraffin operable in the instant invention is between 5-25 wt. percent based on the weight of the high density polyethylene. If amounts of paraffin in excess of the upper limit are employed, the polyethylene has a tendency to stick together thus decreasing the oxidation rate. Amounts of paraffin less than the operable lower limit are not sufficient to show any appreciable increase in the oxidation rate of the polyethylene. The preferred amount of paraffin is 10–20% based on the weight of the polyethylene.

The oxidation time is usually from about 5 to 60 hours. This time is dependent upon the solid state oxidation temperature, the molecular weight of the polyethylene, the amount of paraffin used, the rate of oxygen-containing gas and the final carbonyl content desired.

The final oxidized product of the instant invention can be used in its blended form or the polyethylene can be separated from the paraffin and utilized per se. For example, if a high molecular weight oxidized product is desired having high hardness, the polyethylene could be separated from the paraffin and utilized per se. On the other hand if a lower more readily emulsifiable product is desired, the oxidized polyethylene-paraffin blend would be utilized without separation. In either case due to the high molecular weight of the resulting oxidized polymer it is possible to utilize the blend or the polyethylene per se without emulsifying same in commercial processes such as extrusion, injection molding and the like.

What is claimed is:

1. A process for oxidizing polyethylene having a density in the range of 0.935–0.97 and a reduced specific viscosity of 0.8 to 30 deciliters/g. which comprises blending said polyethylene with 5 to 25% by weight of paraffin and thereafter oxidizing said blend by heating said blend in the presence of a free oxygen-containing gas while maintaining the polyethylene in solid form at a temperature ranging from 105° C. up to the crystalline melting point of said polyethylene until the carbonyl content of said polyethylene is in the range 0.2 to 7.5 weight percent.

2. The process according to claim 1 wherein the free oxygen-containing gas is air.

3. The process according to claim 1 wherein an oxidation promoter selected from the group consisting of an organic peroxide, ozone and nitrogen tetroxide is added to the blend prior to oxidation.

4. The process of claim 1 comprising the further step of separating the oxidized polyethylene and paraffin by dissolving the paraffin in refluxing benzene.

References Cited

UNITED STATES PATENTS

| | | | |
|---|---|---|---|
| 2,952,649 | 9/1960 | McCall et al. | 260—28.5 |
| 3,230,191 | 1/1966 | Roedel | 260—94.9 |
| 3,201,381 | 8/1965 | Hagemeyer | 260—94.9 |

JOSEPH L. SCHOFER, *Primary Examiner.*

L. EDELMAN, *Assistant Examiner.*